(12) United States Patent
Sugino

(10) Patent No.: US 11,313,483 B2
(45) Date of Patent: Apr. 26, 2022

(54) VALVE CORE

(71) Applicant: PACIFIC INDUSTRIAL CO., LTD., Ogaki (JP)

(72) Inventor: Takumi Sugino, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 0 days.

(21) Appl. No.: 16/976,105

(22) PCT Filed: Mar. 29, 2018

(86) PCT No.: PCT/JP2018/013432
§ 371 (c)(1),
(2) Date: Aug. 27, 2020

(87) PCT Pub. No.: WO2019/186956
PCT Pub. Date: Oct. 3, 2019

(65) Prior Publication Data
US 2020/0408314 A1    Dec. 31, 2020

(51) Int. Cl.
| | | |
|---|---|---|
| *F16K 15/20* | (2006.01) | |
| *F25B 45/00* | (2006.01) | |
| *B60C 29/00* | (2006.01) | |
| *B60C 29/06* | (2006.01) | |
| *F16L 37/40* | (2006.01) | |

(52) U.S. Cl.
CPC .............. *F16K 15/20* (2013.01); *F25B 45/00* (2013.01); *B60C 29/005* (2013.01); *B60C 29/06* (2013.01); *F16L 37/40* (2013.01); *Y10T 137/3786* (2015.04); *Y10T 137/7613* (2015.04)

(58) Field of Classification Search
CPC ......... Y10T 137/3584; Y10T 137/6786; Y10T 137/7613
See application file for complete search history.

(56) References Cited

U.S. PATENT DOCUMENTS

| | | | | |
|---|---|---|---|---|
| 854,182 | A | * 5/1907 | Schweinert | ............. F16K 15/20 |
| | | | | 137/234.5 |
| 1,050,491 | A | * 1/1913 | Schweinert | ............. F16K 15/20 |
| | | | | 137/234.5 |

(Continued)

FOREIGN PATENT DOCUMENTS

| | | |
|---|---|---|
| CN | 101059173 A | 10/2007 |
| CN | 201318484 Y | 9/2009 |

(Continued)

OTHER PUBLICATIONS

Dec. 17, 2020 Extended European Search Report issued in European Patent Application No. 18911860.7.

(Continued)

*Primary Examiner* — Robert K Arundale
(74) *Attorney, Agent, or Firm* — Oliff PLC

(57) ABSTRACT

A valve core includes: a barrel part that is cylindrical; a barrel packing that surrounds an outer lateral surface of the barrel part; a washer through which the barrel part penetrates and which abuts on the barrel packing from above; and a head part that includes a male screw part at its outer lateral surface and that rotates relative to the barrel part, wherein a lower surface of the head part abuts on the washer from above.

8 Claims, 9 Drawing Sheets

(56) References Cited

U.S. PATENT DOCUMENTS

| | | | | |
|---|---|---|---|---|
| 1,171,147 | A | * | 2/1916 | Schweinert .............. F16K 15/20 137/234.5 |
| 1,255,411 | A | * | 2/1918 | Greenwald ............. F16K 15/20 137/234.5 |
| 1,338,245 | A | * | 4/1920 | Myers ..................... F16K 15/20 137/232 |
| 1,426,350 | A | * | 8/1922 | Bronson ................ F16K 15/20 137/234.5 |
| 1,453,721 | A | * | 5/1923 | Norwalk ................ F16K 15/20 137/234.5 |
| 1,593,313 | A | * | 7/1926 | Solemink ............... F16K 15/20 137/234.5 |
| 1,991,974 | A | * | 2/1935 | Broecker ................ F16K 15/20 137/231 |
| 2,068,266 | A | | 1/1937 | Engel |
| 2,075,167 | A | * | 3/1937 | Broecker ................ F16K 15/20 137/234.5 |
| 2,228,984 | A | * | 1/1941 | Broecker ................ F16K 15/20 137/231 |
| 2,240,096 | A | * | 4/1941 | Gora ....................... F16K 15/20 137/223 |
| 2,272,634 | A | | 2/1942 | Bronson |
| 2,758,608 | A | | 8/1956 | Sutcliffe |
| 2,862,515 | A | * | 12/1958 | Briechle ................ F16K 15/20 137/234.5 |
| 3,561,467 | A | * | 2/1971 | Lutz ....................... F16K 15/20 137/234.5 |
| 4,462,449 | A | | 7/1984 | Zabel, Jr. |
| 10,428,968 | B2 | | 10/2019 | Yamamoto et al. |
| 2003/0192590 | A1 | * | 10/2003 | Simmons ............... B60C 29/02 137/223 |
| 2004/0261847 | A1 | | 12/2004 | Kayukawa |
| 2006/0237062 | A1 | | 10/2006 | Matsuzawa et al. |
| 2007/0246099 | A1 | * | 10/2007 | Yamamoto .............. B60C 29/00 137/234.5 |
| 2018/0274690 | A1 | | 9/2018 | Yamamoto et al. |

FOREIGN PATENT DOCUMENTS

| | | |
|---|---|---|
| CN | 103727275 A | 4/2014 |
| GB | 157183 A | 5/1921 |
| JP | S52-097702 U | 7/1977 |
| JP | S59-144268 U | 9/1984 |
| JP | 2004-360832 A | 12/2004 |
| JP | 2005-016625 A | 1/2005 |
| JP | 2005-036963 A | 2/2005 |
| JP | 2017-129239 A | 7/2017 |
| WO | 2017/126134 A1 | 7/2017 |

OTHER PUBLICATIONS

Jun. 26, 2018 International Search Report issued in Internaitonal Patent Application No. PCT/JP2018/013432.

Jun. 26, 2018 Written Opinion of the International Searching Authority issued in International Patent Application No. PCT/JP2018/013432.

Aug. 20, 2021 Office Action issued in Korean Patent Application No. 10-2020-7024593.

Sep. 30, 2021 Office Action issued in Chinese Patent Application No. 201880090595.0.

Feb. 7, 2022 Office Action issued in Korean Patent Application No. 10-2020-7024593.

* cited by examiner

VALVE CORE

TECHNICAL FIELD

The present invention relates to a valve core.

BACKGROUND ART

Patent Document 1 discloses a valve core in which a barrel packing fitted to the outer surface is pressed by a flange part against the inner surface of a valve stem.

RELATED ART DOCUMENTS

Patent Documents

Patent Document 1: Japanese Unexamined Patent Application Publication No. 2004-360832 (FIG. 3)

SUMMARY OF THE INVENTION

Problems to be Solved by the Invention

Here, in the above-described valve core, part of the valve core such as the flange part may deform. It is desired to suppress such deformation.

Means of Solving the Problems

In order to solve the problem, a valve core according to one aspect of the present disclosure including: a barrel part that is cylindrical; a barrel packing that surrounds an outer lateral surface of the barrel part; a flange part that abuts on the barrel packing from above; and a head part that includes a male screw part at its outer lateral surface and that rotates relative to the barrel part. A lower surface of the head part abuts on the flange part from above.

MODE FOR CARRYING OUT THE INVENTION

Figure 1:
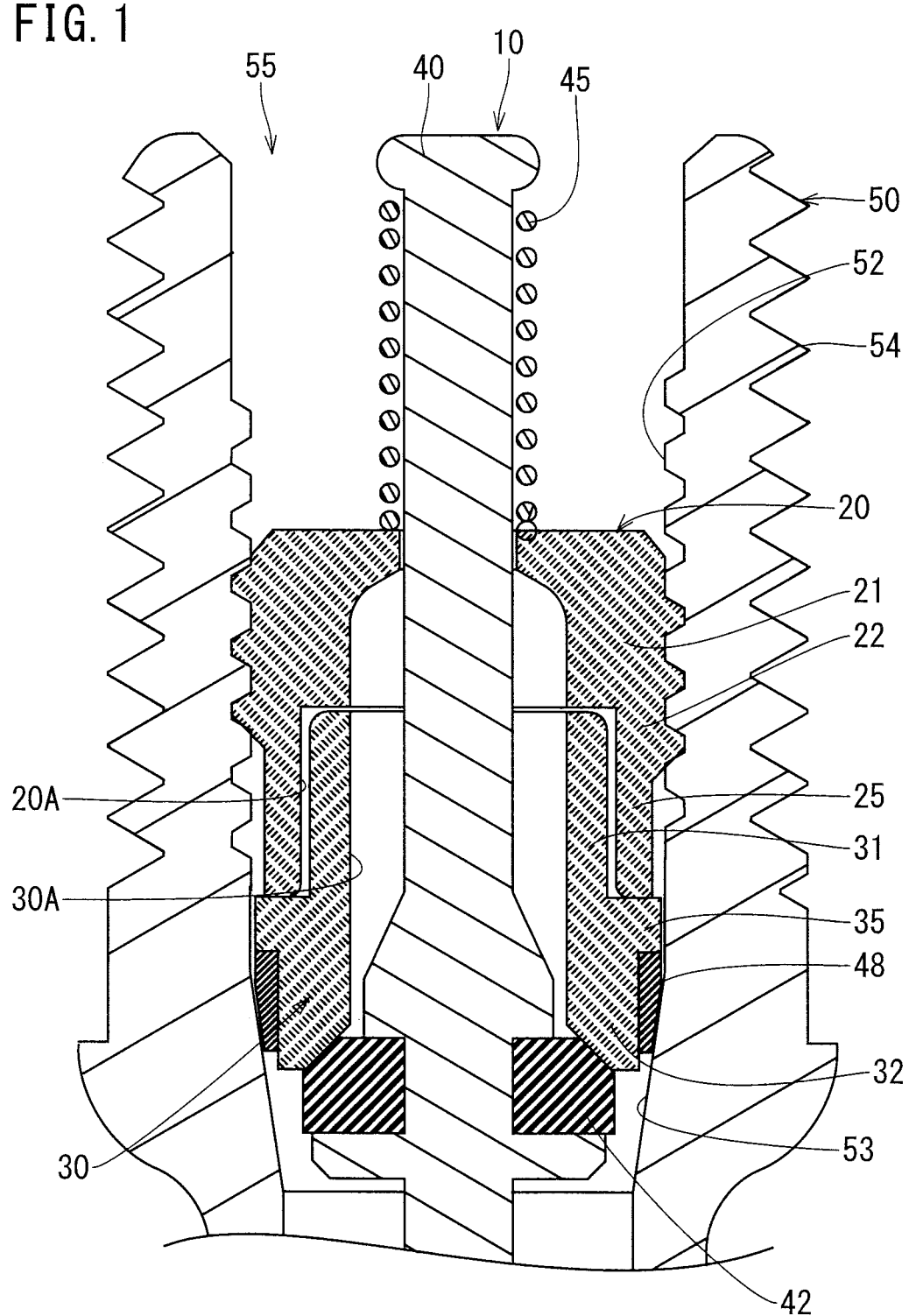
FIG. 1 is a sectional side view of a valve core according to an embodiment.

Hereinafter, FIG. 1 illustrates a valve stem 50 that houses a valve core 10 according to the present embodiment. The valve stem 50 is cylindrical and extends from a tire (not shown). The inside of the valve stem 50 serves as a core mount hole 55 that communicates with the inner space of the tire. At the position near the opening of the core mount hole 55, a female screw part 52 is formed. On the depth side of the core mount hole 55, a diameter-reduced part 53 having its diameter gradually reduced as becoming farther from the female screw part 52 is provided. On the outer circumferential surface of the valve stem 50, a male screw part 54 for screwing and fixing to a not-shown cap is formed.

Figure 2:
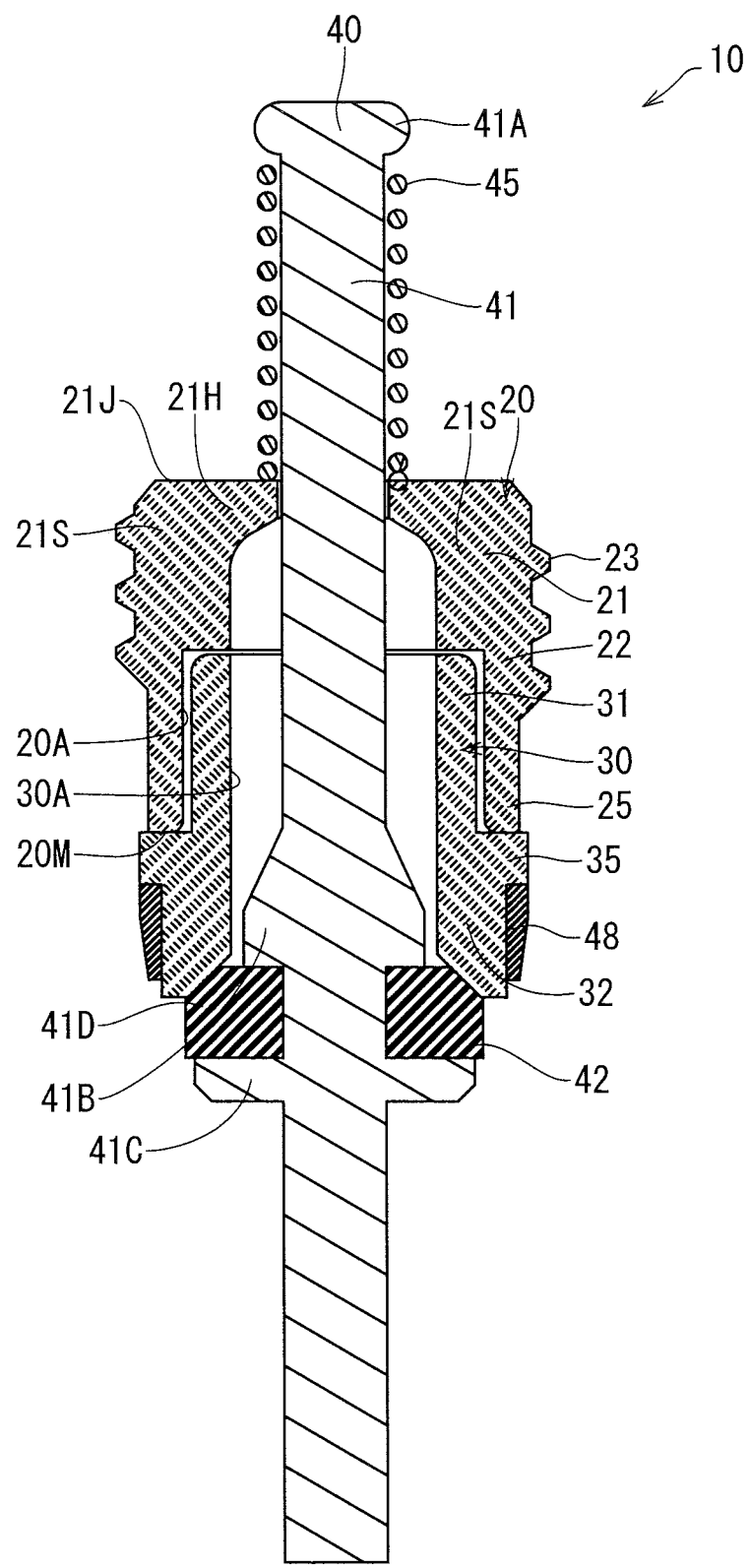
FIG. 2 is a sectional side view of the valve core.

Into the core mount hole 55, the valve core 10 according to the present embodiment is screw-fixed. As shown in FIG. 2, the valve core 10 includes a head part 20, a barrel part 30, and a movable shaft 40 inserted into the head part 20 and the barrel part 30. Note that, in the following, the side where the head part 20 is disposed relative to the barrel part 30 is referred to as the upper side, and the side opposite thereto is referred to as the lower side.

The movable shaft 40 includes a spring stop part 41A that engages with a compression coil spring 45 at the upper end of a shaft part 41 that penetrates through the central parts of the head part 20 and the barrel part 30, and further includes a valve body 42 at the midway position. The valve body 42 is formed of a tapered part 41B having its diameter gradually increased from the shaft part 41, a column part 41C greater in diameter than the tapered part 41B and disposed as being spaced apart from the diameter-increased side end (the lower end) of the tapered part 41B, and a seal part 41D interposed between the tapered part 41B and the column part 41C. Note that, the movable shaft 40 according to the present embodiment is formed of a conductor such as a brass, and the seal part 41D is formed of an elastic member such as rubber or elastomer.

Figure 3A:
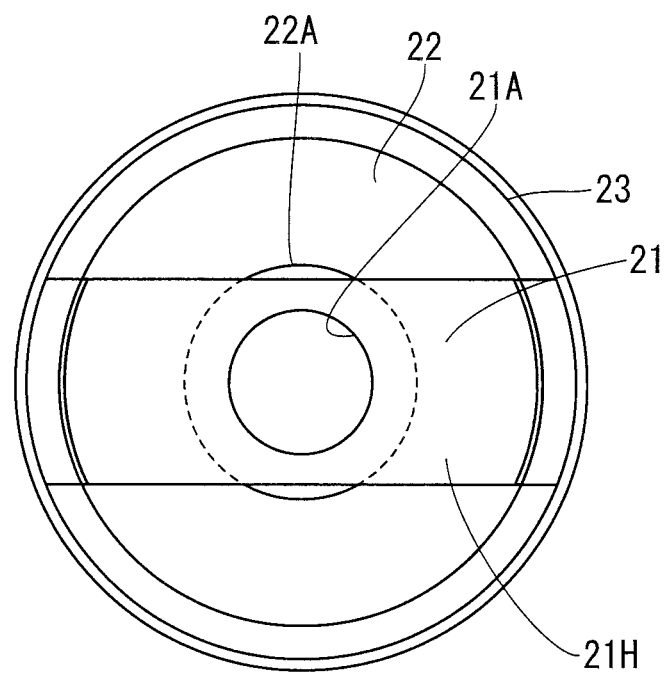
FIG. 3(A) is a top view of a head part.

The head part 20 includes, at its center, a through hole 20A into which the movable shaft 40 and the upper end of the barrel part 30 are inserted. The head part 20 is further provided with, at its outer lateral surface, a male screw part 23 that screws with the valve stem 50. Specifically, as shown in FIG. 3, the head part 20 includes: a disc-like base part 22; and a gate part 21 that has a gate structure formed of a pair of struts 21S, 21S respectively standing from two positions separated from each other by 180 degrees at the upper end surface of the base part 22 and a bridge part 21H provided across the struts 21S, 21S. Through the center of the bridge part 21H, a guide hole 21A that is substantially coaxial to the central axis of the base part 22 penetrates. The width of the bridge part 21H in the radial direction is greater than the width of the base part 22 in the radial direction. The head part 20 according to the present embodiment is formed of an insulator such as ceramic or resin.

As shown in FIG. 2, between the spring stop part 41A of the movable shaft 40 and the head part 20, a compression coil spring 45 is provided. The shaft part 41 is inserted into the compression coil spring 45 compressed between the spring stop part 41A and the upper surface 21J of the gate part 21.

The barrel part 30 is cylindrical and provided with a through hole 30A at its center into which the movable shaft 40 is inserted. The barrel part 30 includes, at its midway position, a flange part 35 which projects outward. In the barrel part 30, the outer diameter of an insert part 31 formed upper than the flange part 35 is smaller than the through hole 20A of the head part 20, and the insert part 31 is inserted into the through hole 20A of the head part 20. The outer diameter of a base part 32 formed lower than the flange part 35 is greater than the outer diameter of the insert part 31. Furthermore, at the lower end of the base part 32, a tapered part 32T having its inner diameter gradually reduced upward is formed. To the tapered part 32T, a seal part 42D of the valve body 42 of the movable shaft 40 biased upward by the compression coil spring 45 fits. Note that, the barrel part 30 according to the present embodiment is formed of an insulator such as ceramic or resin.

Figure 4:
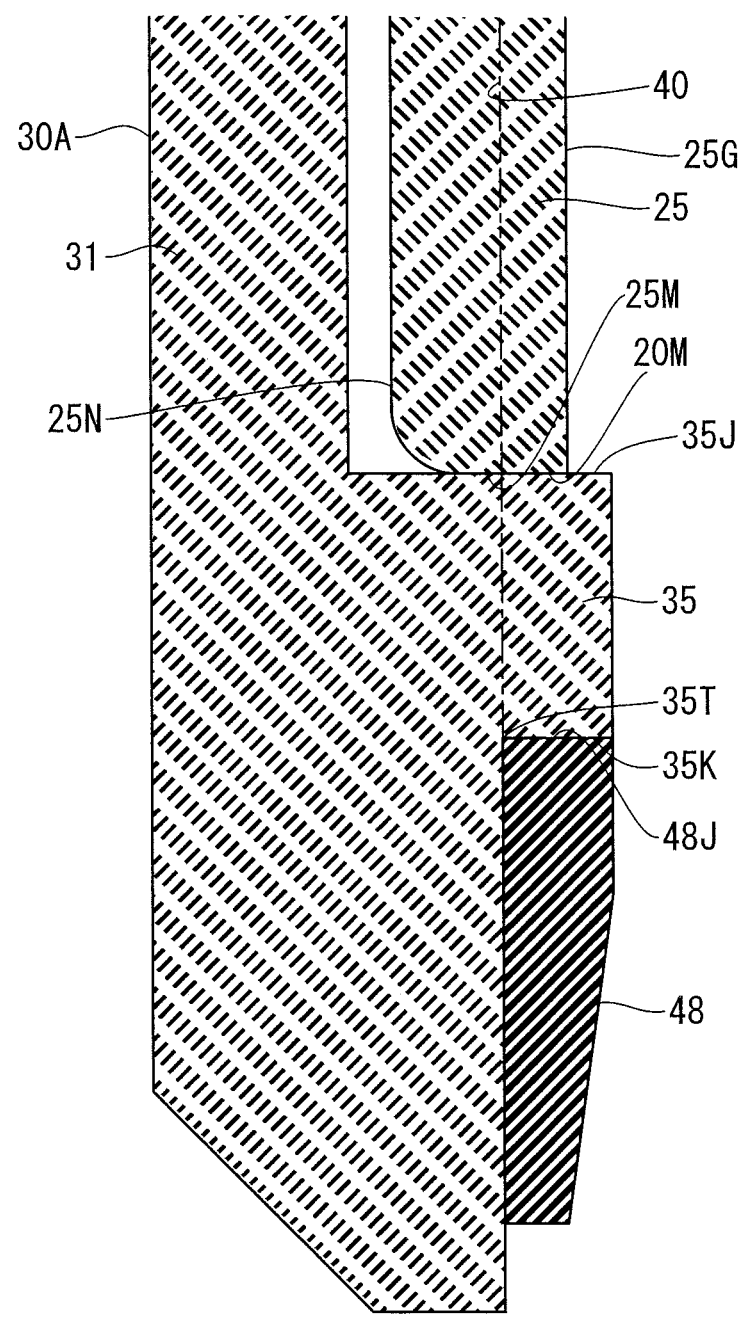
FIG. 4 is an enlarged sectional side view of the valve core.

Meanwhile, the barrel part 30 is provided with a barrel packing 48 that surrounds the outer lateral surface 30M of the barrel part 30. The barrel packing 48 is formed of, for example, elastomer. As shown in FIG. 4, the barrel packing 48 has its upper surface 48J abutted on a lower surface 35K of the flange part 35. The barrel packing 48 has the diameter of the outer lateral surface reduced from the intermediate position in the top-bottom direction to the lower end. Note that, the thickness of the barrel packing 48 is made to be substantially identical to the projecting amount of the lower surface of the flange part 35.

Figure 3B:
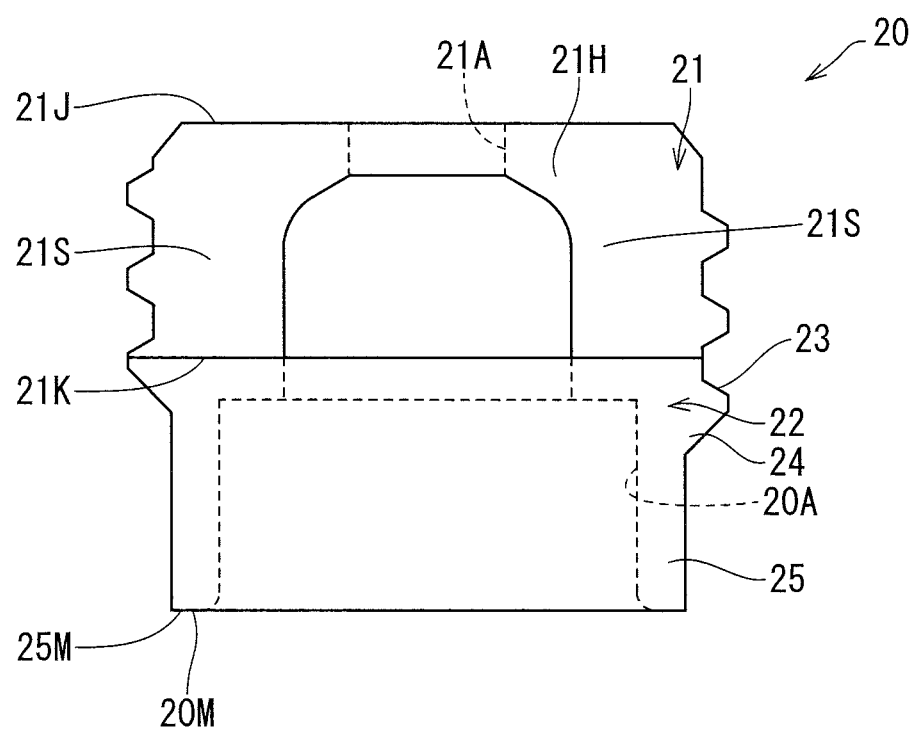
FIG. 3(B) is a side view of the head part.

Here, as shown in FIG. 2, in the valve core 10 according to the present embodiment, a lower surface 20M of the head part 20 is configured to abuttable on the flange part 35. Specifically, as shown in FIG. 3(B), the base part 22 of the head part 20 includes a screwing sleeve part 24 provided with a male screw part 23 at its outer lateral surface and an extending part 25 extending downward from the screwing sleeve part 24. A lower surface 25M of the extending part 25 abuts on an upper surface 35J of the flange part 35.

As shown in FIG. 4, the lower surface 20M of the head part 20 is disposed at the position overlapping the barrel packing 48 in the top-bottom direction. Specifically, the lower surface 20M of the head part 20 has its outer edge part 25G disposed at the central position in the radial direction of the barrel packing 48, and has its inner edge part 25N disposed at the position overlapping the base part 32 of the barrel part 30. That is, the lower surface 20M of the head part 20 abuts on the flange part 35 across a root part 35T of the flange part 35 on the lower surface 35K side in the radial direction.

The foregoing is the description of the structure of the valve core 10 according to the present embodiment. The valve core 10 is mounted on the core mount hole 55 in the following manner. That is, the valve core 10 is rotated in a state of being inserted into the core mount hole 55 from the barrel part 30 side. Then, the male screw part 23 formed at the head part of the valve core 10 screws with the female screw part 52 of the core mount hole 55, and the valve core 10 shifts to the depth side of the core mount hole 55. Then, as shown in FIG. 1, the barrel packing 48 that covers the barrel part 30 abuts on the diameter-reduced part 53 of the core mount hole 55, thereby to stop the rotation of the head part 20.

Figure 5:
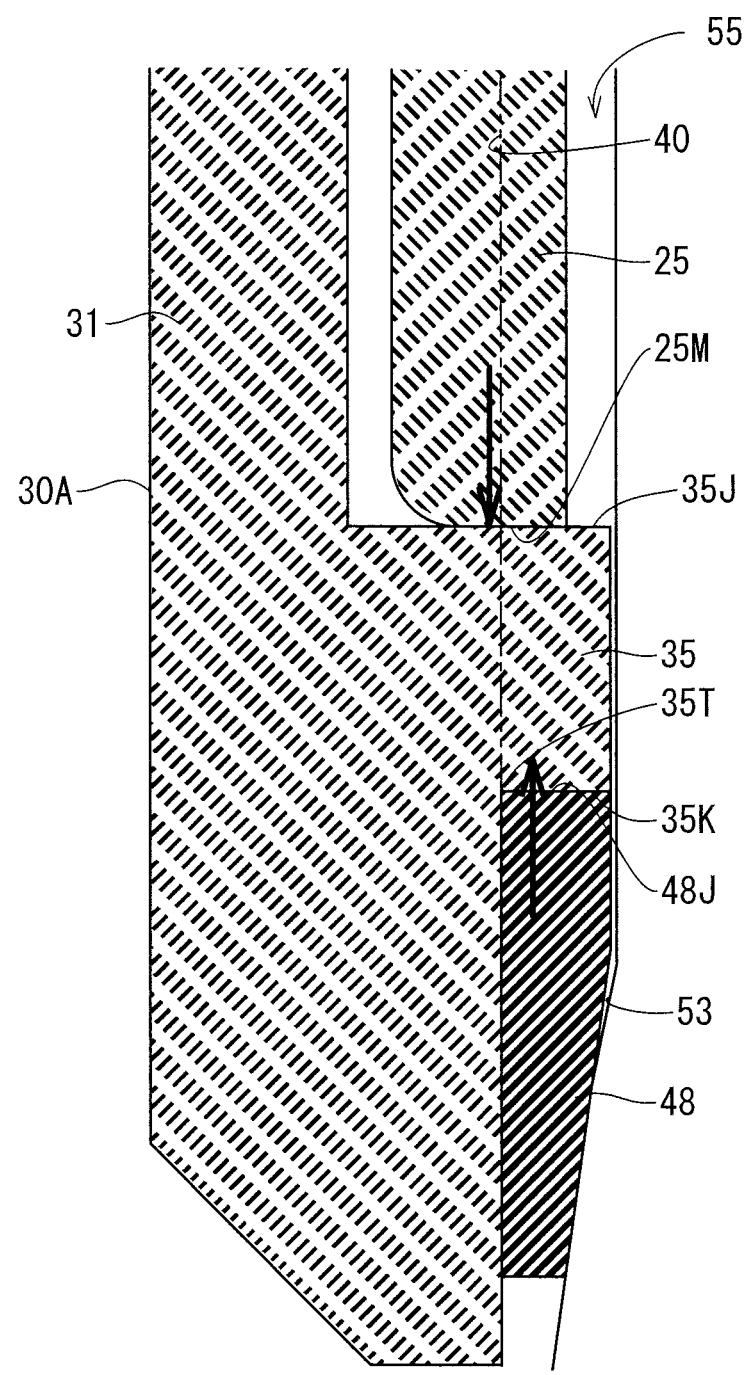
FIG. 5 is an enlarged sectional side view of the valve core.

As shown in FIG. 5, when mounting the valve core 10 into the core mount hole 55, since the barrel packing 48 is pushed toward the flange part 35 by the diameter-reduced part 53, great bending stress is applied to the flange part 35. Here, in the valve core 10 according to the present embodiment, the lower surface 20M of the head part 20 abuts on the flange part 35 from above. That is, the flange part 35 is interposed between the head part 20 and the barrel packing 48. The flange part 35 is pushed downward by the head part 20 against the bending stress which is applied upward by the barrel packing 48. This reduces the bending stress by the barrel packing 48 pushing upward, which contributes to suppressing deformation of the flange part 35.

In the valve core 10 according to the present embodiment, the lower surface 20M of the head part 20 abuts on the flange part 35 across the root part 35T on the lower surface 35K side of the flange part 35 in the radial direction. That is, the valve core 10 is structured to back up the portion above the portion where stress tends to concentrate. This contributes to suppressing deformation of the flange part 35.

In the valve core 10 according to the present embodiment, the movable shaft 40 is formed of a conductor and the head part 20 and the barrel part 30 are formed of an insulator. Therefore, the movable shaft 40 can be used as a current path.

OTHER EMBODIMENTS

The present invention is not limited to the above-described embodiment, and various changes may be made within the range not deviating from the scope of the present invention.

Figure 6:
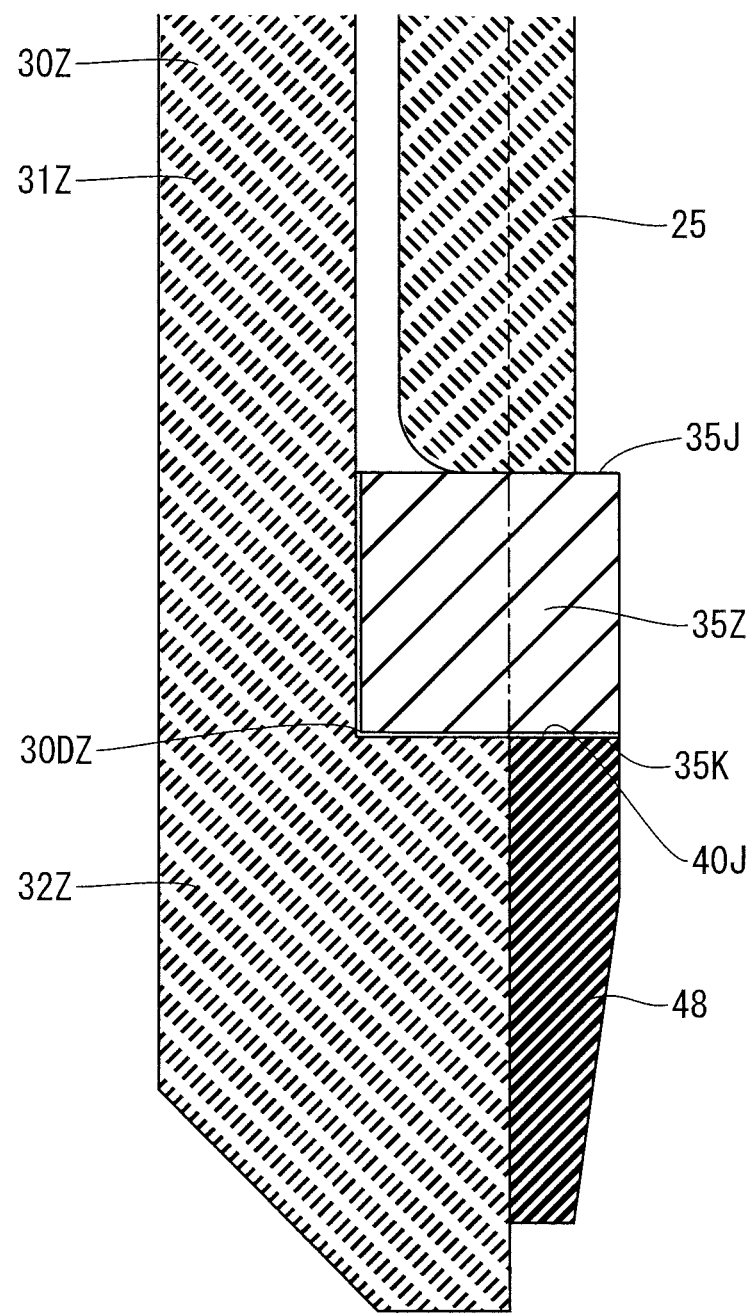
FIG. 6 is a sectional side view of a valve core according to a variation.
Figure 7:
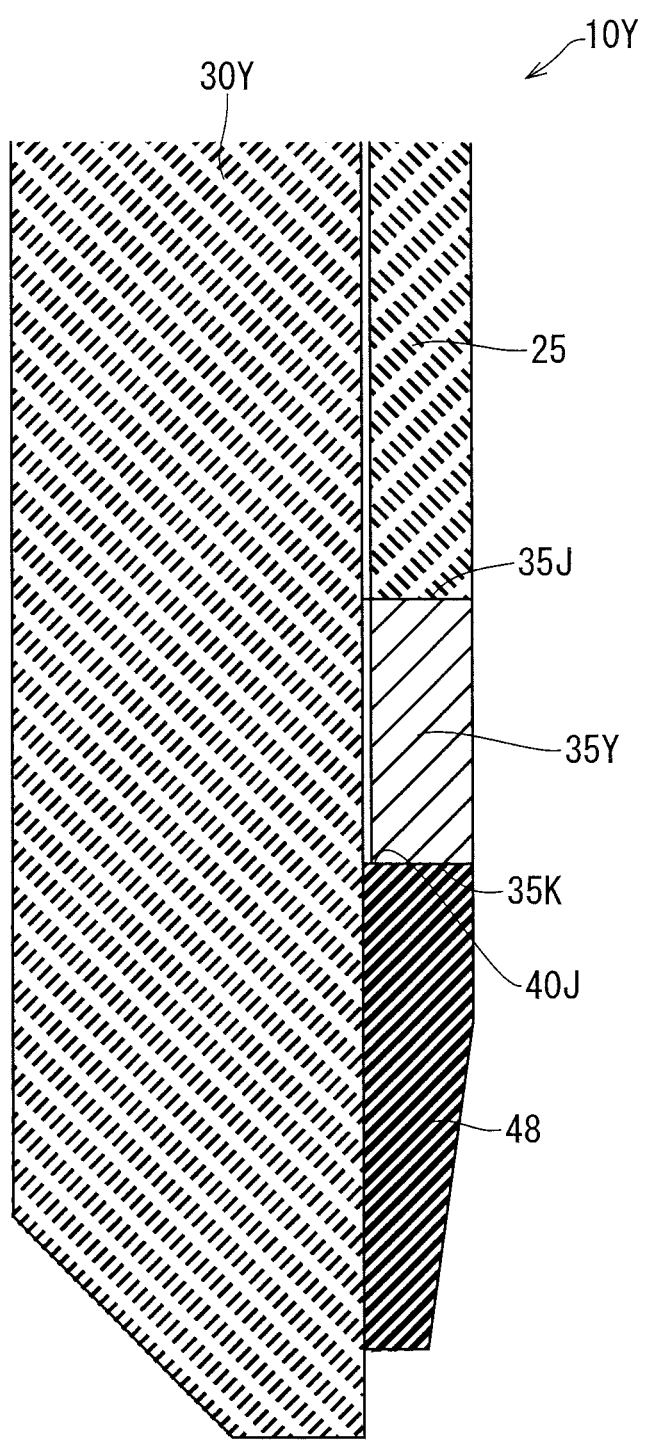
FIG. 7 is a sectional side view of a valve core according to a variation.

(1) As shown in FIGS. 6 and 7, the flange part may be a washer 35Z, 35Y through which a barrel part 30Z, 30Y penetrates. This causes the load on the flange part 35Z, 35Y from the barrel packing 48 to be less transferred to the barrel part 30Z, 30Y.

As shown in FIG. 6, in the structure of the barrel part 30Z with the washer 35Z, the barrel part 30Z may be provided with a step-height part 30DZ. There is a method of inserting the insert part 31Z through the washer 35Z, and placing the inner edge part of the washer 35Z at the upper surface of the base part 32Z. Thus, the washer 35Z can be positioned by the step-height part 30DZ between the insert part 31Z and the base part 32Z.

As shown in FIG. 7, as other structure of the barrel part 30Y with the washer 35Y, the outer shape of the barrel part 30Y may not have any step height. In this structure, the barrel part 30Y can be manufactured easily. Note that, in this case, the washer 35Y is positioned by being abutted on the barrel packing 48 or the lower surface 20M of the head part 20.

Figure 8B:
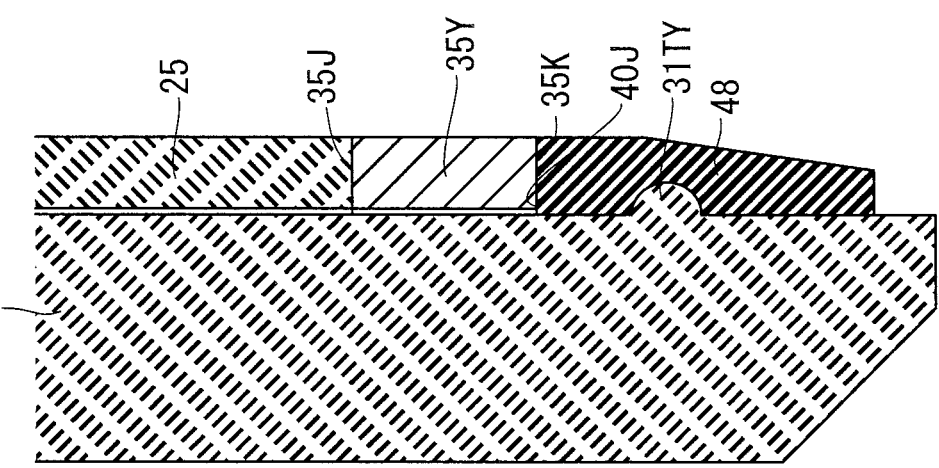
FIG. 8 is a sectional side view of a valve core according to a variation.
Figure 8A:
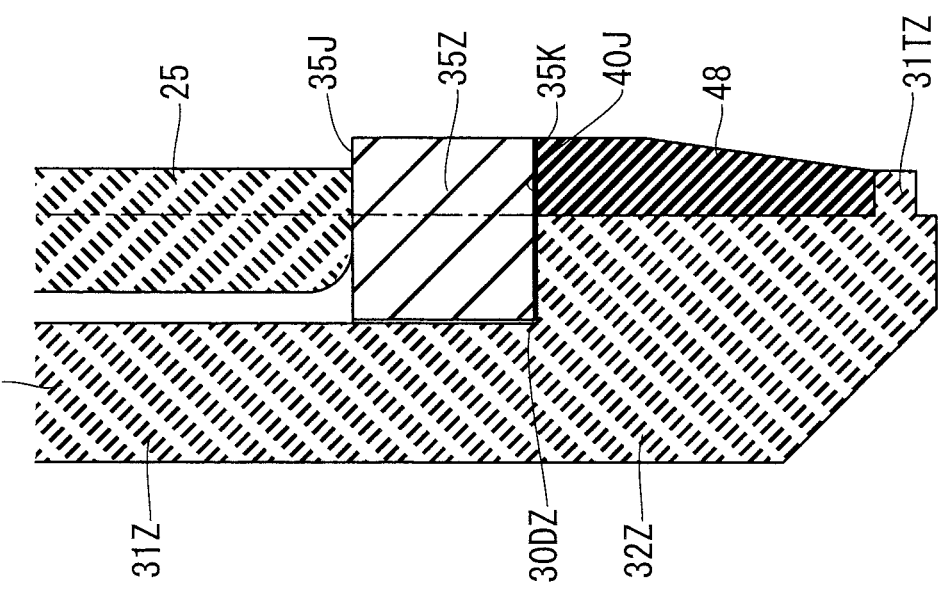

Furthermore, as shown in FIG. 8, when the flange part is the washer 35Z, 35Y, an engaging piece 31TZ, 31TY that projects outward from the barrel part 30 and engages with the barrel packing 48 may be provided. For example, as the engaging piece 31TZ shown in FIG. 8(A), the engaging piece 31TZ may abut on the lower surface of the barrel packing 48. As the engaging piece 31TY shown in FIG. 8(B), the engaging piece 31TY may engage at the midway position of the barrel packing 48.

(3) In the above-described embodiment, the male screw part 23 is not formed at the outer lateral surface of the extending part 25. Here, the male screw part 23 may be formed at the outer lateral surface of the extending part 25.

Figure 9:
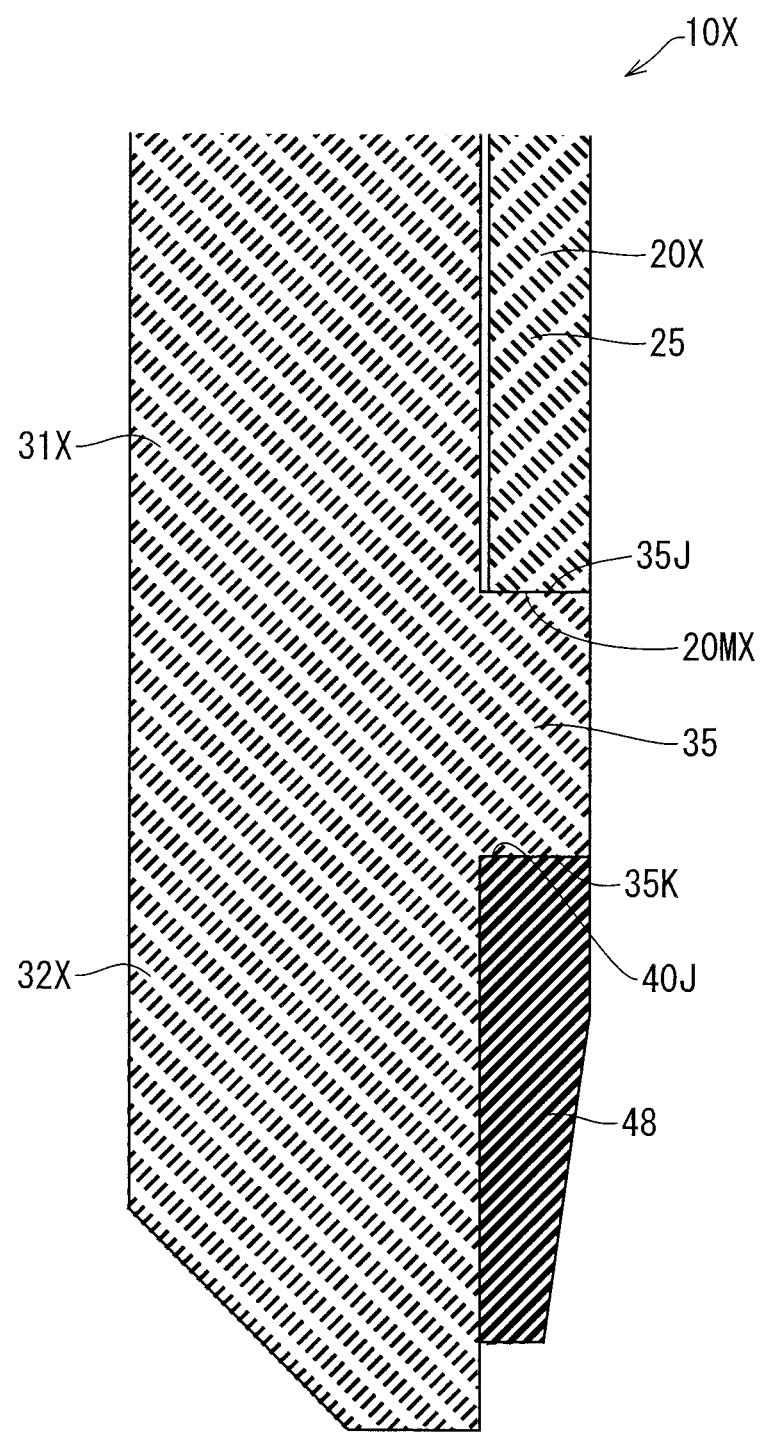
FIG. 9 is a sectional side view of a valve core according to a variation.

(4) As shown in FIG. 9, the insert part 31X and the base part 32X may be substantially identical to each other in outer diameter. In this case, the entire lower surface 20MX of the head part 20X is disposed at the position overlapping the barrel packing 48 in the top-bottom direction.

(5) In the above-described embodiment, the lower surface 20M of the head part 20 is disposed across the position above the barrel packing 48 and the position above the base part 32. Here, the lower surface 20M of the head part 20 may be disposed only at the position above the barrel packing 48.

(6) The extending part 25 is cylindrical, and the entire lower surface of the extending part 25 abuts on the upper surface 35J of the flange part 35. Here, the lower surface 25M may not entirely abut on the upper surface 35J of the flange part 35, for example, by being provided with a cutout. Furthermore, a plurality of projection pieces may extend downward from the screwing sleeve part, having the lower surfaces of the projection pieces abutted on the flange part 35.

(7) In the above-described embodiment, while the head part 20 and the barrel part 30 are formed of an insulator, they may be formed of a conductor. Furthermore, the valve core 10 may be formed of an insulator.

DESCRIPTION OF THE REFERENCE NUMERAL

10 valve core
20 head part
20A through hole
20M, 25M lower surface
21 gate part
22 base part
23 male screw part
24 screwing sleeve part
25 extending part
30 barrel part
35 flange part
35Z, 35Y washer
40 movable shaft
41 shaft part
48 barrel packing
50 valve stem

The invention claimed is:

1. A valve core comprising:
 a barrel part that is cylindrical;
 a barrel packing that surrounds an outer lateral surface of the barrel part;
 a washer through which the barrel part penetrates and which abuts on the barrel packing from above; and
 a head part that includes a male screw part at its outer lateral surface and that rotates relative to the barrel part, wherein:
   a lower surface of the head part abuts on the washer from above, and
  the barrel part includes:
   an insert part around which the washer is provided,
   a base part having an outer diameter greater than an outer diameter of the insert part and smaller than an outer diameter of the washer, and
   a step-height surface which is formed between the base part and the insert part, and on which the washer abuts while the barrel packing surrounds an outer lateral surface of the base part.

2. The valve core according to claim 1, further comprising an extending sleeve part that is cylindrical and extends from the male screw part toward the barrel part.

3. The valve core according to claim 1, wherein the lower surface of the head part and the barrel packing are disposed at positions overlapping each other in a top-bottom direction.

4. The valve core according to claim 2, wherein the lower surface of the head part and the barrel packing are disposed at positions overlapping each other in a top-bottom direction.

5. The valve core according to claim 1, wherein the head part and the barrel part are formed of ceramic or resin.

6. The valve core according to claim 2, wherein the head part and the barrel part are formed of ceramic or resin.

7. The valve core according to claim 3, wherein the head part and the barrel part are formed of ceramic or resin.

8. The valve core according to claim 4, wherein the head part and the barrel part are formed of ceramic or resin.

\* \* \* \* \*